US012115606B2

(12) United States Patent
Ihde et al.

(10) Patent No.: US 12,115,606 B2
(45) Date of Patent: Oct. 15, 2024

(54) SYSTEMS AND METHODS FOR REMOTE WELD SCHEDULE CONTROL

(71) Applicant: Illinois Tool Works Inc., Glenview, IL (US)

(72) Inventors: Jeffery R. Ihde, Greenville, WI (US); Cody J. Bowman, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 794 days.

(21) Appl. No.: 17/031,346

(22) Filed: Sep. 24, 2020

(65) Prior Publication Data
US 2021/0114130 A1   Apr. 22, 2021

Related U.S. Application Data

(60) Provisional application No. 62/924,414, filed on Oct. 22, 2019.

(51) Int. Cl.
*B23K 9/10* (2006.01)
(52) U.S. Cl.
CPC .................. *B23K 9/1087* (2013.01)
(58) Field of Classification Search
CPC .. B23K 9/1087; B23K 9/1062; B23K 9/1043; B23K 9/1068; B23K 37/00; B23K 9/095; B23K 9/10; B23K 9/1006; B23K 9/133; B23K 9/32; H04W 12/04; H04W 12/08; H04W 12/50; H04W 12/082; H04L 63/062; F02N 11/0807; F02D 29/06; F02D 31/001
USPC .......................................................... 219/132
See application file for complete search history.

(56) References Cited

U.S. PATENT DOCUMENTS

| 2006/0175314 | A1* | 8/2006 | Hayes ................. B23K 9/0953 219/125.1 |
| 2015/0114942 | A1 | 4/2015 | Denis et al. |
| 2015/0273609 | A1 | 10/2015 | Denis |
| 2015/0273611 | A1* | 10/2015 | Denis .................... H04W 12/50 219/132 |
| 2017/0036288 | A1 | 2/2017 | Albrecht |
| 2018/0304392 | A1* | 10/2018 | Daniel ............... G05B 19/4183 |

FOREIGN PATENT DOCUMENTS

JP        2018103191        7/2018

OTHER PUBLICATIONS

European Office Communication Appl No. 20201493.2 dated Mar. 17, 2021.
European Examination Report Appl No. 20201493.2 dated Nov. 2, 2023.

* cited by examiner

*Primary Examiner* — Vy T Nguyen
(74) *Attorney, Agent, or Firm* — McAndrews, Held & Malloy, Ltd.

(57) ABSTRACT

Systems and methods for remote control of a weld schedule of a welding power supply are disclosed. In some examples, a remote device is provided for monitoring or controlling the welding power supply, which controls and delivers power to one or more welding tools (e.g., a welding torch) and/or accessories (e.g., a wire feeder). The remote device includes a user interface to receive one or more inputs, which are provided to a control circuitry configured to transmit signals to or receive signals from the welding power supply via a remote transceiver. In some examples, the signals include data corresponding to one or more weld schedules.

19 Claims, 9 Drawing Sheets

| 1 |       | 1A: Pulsed TIG   |
|---|-------|------------------|
|   |       | 1A: Auto Stop    |
|   |       | 1A: Auto Crater  |
| 2 | XX 18 | 2A: Dig          |
|   |       | 2A: Arc Control  |
|   |       | 2A: Hot Start    |
| 3 | XX10  | 3A: Dig          |
|   |       | 3A: Arc Control  |
|   |       | 3A: Hot Start    |
| 4 | XX …  | 4A: Dig          |
|   |       | 4A: Arc Control  |
|   |       | 4A: Hot Start    |

FIG. 2A

| 1 | Root Weld | 1A: Dig         |             |
|---|-----------|-----------------|-------------|
|   |           | 1B: Arc Control | 1B-1: Droop |
|   |           |                 | 1B-2: Dig   |
|   |           | 1C: Hot Start   |             |
| 2 | Hot Pass  | 2A: Dig         |             |
|   |           | 2B: Arc Control | 2B-1: Droop |
|   |           |                 | 2B-2: Dig   |
|   |           | 2C: Hot Start   |             |
| 3 | Fill      | 3A: Dig         |             |
|   |           | 3B: Arc Control | 3B-1: Droop |
|   |           |                 | 3B-2: Dig   |
|   |           | 3C: Hot Start   |             |
| 4 | Cap Pass  | 4A: Dig         |             |
|   |           | 4B: Arc Control | 4B-1: Droop |
|   |           |                 | 4B-2: Dig   |
|   |           | 4C: Hot Start   |             |

FIG. 2B

SYSTEMS AND METHODS FOR REMOTE WELD SCHEDULE CONTROL

CROSS REFERENCE TO RELATED APPLICATIONS

This application is a Non-Provisional patent application which claims priority to U.S. Provisional Patent Application No. 62/924,414, entitled "Systems And Methods For Remote Weld Schedule Control", filed Oct. 22, 2019, the contents of which are herein incorporated by reference in their entirety.

BACKGROUND

Conventionally, welding power supplies include a control panel located with the welding power supply to provide access to controls at the location of the welding power supply. Remote control of the welding power supply, however, has proven challenging. It is therefore desirable to employ systems and methods that provide an operator with tools for remote control of a welding power supply.

SUMMARY

Systems and methods for remote control of a weld schedule of a welding power supply are disclosed, substantially as illustrated by and described in connection with at least one of the figures.

BRIEF DESCRIPTION OF THE DRAWINGS

FIG. 2A is an example listing of weld schedules, in accordance with aspects of this disclosure.

FIG. 2B is an example listing of operational settings, in accordance with aspects of this disclosure.

The figures are not necessarily to scale. Where appropriate, similar or identical reference numbers are used to refer to similar or identical components.

DETAILED DESCRIPTION

Figure 1A:
FIG. 1A is an illustration of an example remote device, in accordance with aspects of this disclosure.

Disclosed are systems and methods for remote control of a weld schedule of a welding power supply. When using a remote control for welding, it is desirable to be able to remotely change weld schedules at the work site during welding. This provides for a quick change from an existing setting to a new setting after a weld is complete. As the weld schedules or programs are changed, the different settings change to those tailored for the welding operation being performed (e.g., a root pass welding operation, a hot pass welding operation, a joint fill welding operation, or a cap pass welding operation). Operational settings of the welding power supply can also be changed to optimize welding performance, with operational settings including one or more of a weld flat horizontal weld, a vertical weld, or an overhead weld.

As disclosed herein, a weld schedule includes one or more instructions used to configure a welding system for a specific welding operation. For instance, the weld schedule (or weld profile) includes specific settings for the welding power supply (e.g., control settings), specific tools (e.g., type of welding torch, cutter, etc.), material to be welded (e.g., type, thickness, etc.), electrodes, times, rates of movement and/or wire feed speed, type of joint, and/or other data associated with a welding parameter for the specific welding operation.

The weld schedule may also include information about the part or workpiece on which the welding operation is being performed. For instance, the weld schedule may include information regarding material type, workpiece thickness, number of welds to be performed, weld locations on the workpiece, quality requirements, and/or workpiece preparation.

The instructions and/or weld schedule information can be stored in a memory storage device associated with the remote device and/or the welding power supply and can be used to configure the system for the specific welding operation.

In some examples, a default weld schedule can be implemented for one or more welding operations. Default weld schedules can be used as a starting point for a welding operation, which can be configured for the specific welding operation. For example, the configured weld schedule may vary based on differences in materials being welded, variations in the welding power supply and/or tools employed, environmental circumstances, and/or weld quality standards for the specific welding operation.

Conventionally, when an operator is performing multiple welds, especially when the welding power supply control panel is a distance from the workpiece, the multiple welds may be performed with a "middle of the road setting" setting. In other words, for two distinct welds with different ideal settings, the first weld may be too hot, with the second being too cold. The settings for each weld may be within an operating threshold for each weld, but neither weld is performed with an ideal weld schedule.

Advantageously, the disclosed systems and methods improve weld performance, as the optimum weld schedule (and/or other operational settings or welding parameters) are remotely and intuitively implemented, such as in response to a change in the weld joint, welding position, welding tool, material, etc. Therefore, each weld can be implemented with the desired settings.

Disclosed are systems and methods for remote control of a weld schedule of a welding power supply. In some examples, a remote device is provided for monitoring or controlling the welding power supply, which controls and delivers power to one or more welding tools (e.g., a welding torch) and/or accessories (e.g., a wire feeder). The remote device includes a user interface to receive one or more inputs, which are provided to a control circuitry configured to transmit signals to or receive signals from the welding power supply via a remote transceiver. In some examples, the signals include data corresponding to one or more weld schedules.

To implement remote control of a weld schedule, the control circuitry (e.g., a remote control circuitry) receives one or more first inputs from the user interface to implement a first weld schedule of the one or more weld schedules. For example, a list of weld schedules may be available via the user interface, and an operator may select the first weld schedule for implementation. Once selected, the control circuitry generates one or more first signals corresponding to the first weld schedule in response to the one or more first inputs. The first signals may contain data and/or be transmitted with characteristics to uniquely identify the selected first weld schedule. Thus, the first signals are transmitted via the transceiver to the welding power supply to control the welding power supply to implement the first weld schedule.

The remote device displays information associated with the first weld schedule, including welding parameters associated with the first weld schedule and/or other operating parameters, as well as stores information regarding previous inputs. In some examples, an operator may seek to change from a first to a second weld schedule. For instance, during a given welding operation, the part may require different weld schedules to ensure a proper weld. This may include a change in joint, a change in orientation, a change in material, etc. Thus, the control circuitry may receive one or more second inputs from the user interface to implement a second weld schedule. The control circuitry generates second signals corresponding to the second weld schedule in response to the second inputs from the user interface. The second signals are then transmitted via the transceiver to the weld power supply to control the welding power supply to implement the second weld schedule.

In some examples, the first or second weld schedules correspond to a root pass welding operation, a hot pass welding operation, a joint fill welding operation, or a cap pass welding operation. In examples, the remote device may control one or more of operational settings and/or welding parameters of the welding power supply. For instance, the control circuitry may receive one or more third inputs to control one or more operational settings of the welding power supply, which may include one or more of a weld flat horizontal weld, a vertical weld, or an overhead weld. The control circuitry may then generate one or more third signals corresponding to the operational settings in response to the third inputs from the user interface and transmit the third signals to the welding power supply to control the welding power supply to implement the operational settings.

Similarly, the control circuitry can receive one or more fourth inputs to control one or more welding parameters of the welding power supply, which can include at least a weld flat horizontal weld, a vertical weld, or an overhead weld. One or more fourth signals corresponding to the one or more welding parameters are generated in response to the fourth inputs, and transmitted to the welding power supply to control the welding power supply to implement the welding parameters. For example, the welding parameters can include a voltage, a current, a power value, a material type, a number of welds to perform, or a time of welding.

Having been implemented, the welding power supply is configured to provide confirmation to the remote device that the command has been executed. For instance, the control circuitry is to receive a confirmation signal that the first, second, third or fourth signals were received at the welding power supply and that the selected weld schedule, operating and/or welding parameters have been implemented in response. Having received that confirmation, the control circuit adjusts an indicia corresponding to the implemented weld schedule, operational settings and/or welding parameters on the user interface to reflect the change at the welding power supply. In circumstances when confirmation is not received, the control circuitry can be programmed to display the last confirmed weld schedule, operational settings, and/or welding parameters, and/or update the display to the selected weld schedule, operating and/or welding parameters, based on the particular welding operation and/or operator preferences.

In some examples, the remote device is a portable handheld wireless device. In some examples, the remote user interface or the welding user interface comprises one or more of a button, a membrane panel switch, or a graphical user interface to provide input to control the welding power system. In some examples, the control circuitry includes one or more network interfaces to connect to a remote computing system via one or more of LAN, WAN, Bluetooth, Wi-Fi, or cellular networks. In some examples, the various signals between the remote device and the welding power supply are encoded with information to uniquely identify the respective device or system. In some examples, the various signals between the remote system and the welding power supply are transmitted with one or more transmission characteristics to uniquely identify the respective system.

As the remote device is but one source of control, such that the welding power supply user interface can similarly control weld schedules, in some examples the remote device can operate in a variety of modes to avoid conflict between commands. In some examples, the welding power supply receives and implements commands from both the remote device and the welding power supply (e.g., via the welding interface). For instance, a control circuitry of the welding power supply can implement one or more techniques to avoid conflict between multiple control sources. The techniques can include implementing a priority scheme based on time of arrival of a signal, the source of the signal, and/or the received command (e.g., a shut of signal versus adjustment of a welding parameter).

Advantageously, an operator can assign limits to the remote device control, thereby limiting which weld schedules (or what scope of welding parameters within those weld schedules) available for modification. Remote control is further managed by activation of one or more locks (e.g., hardware and/or software) to predetermined weld schedules and/or welding parameters, which prevents inadvertent or unapproved changes.

In disclosed examples, a remote device for monitoring or controlling a welding power supply to control and deliver power to one or more welding tools or accessories; a user interface to receive one or more inputs; a control circuitry comprising a transceiver configured to transmit one or more signals to or receive one or more signals from the welding power supply, the one or more signals including data corresponding to one or more weld schedules, the control circuitry configured to: receive one or more first inputs from the user interface to implement a first weld schedule of the one or more weld schedules; generate one or more first signals corresponding to the first weld schedule in response to the one or more first inputs from the user interface; transmit the one or more first signals to the welding power supply to control the welding power supply to implement the first weld schedule; receive one or more second inputs from the user interface to implement a second weld schedule of the one or more weld schedules; generate one or more second signals corresponding to the second weld schedule in response to the one or more second inputs from the user interface; and transmit the one or more second signals to the weld power supply to control the welding power supply to implement the second weld schedule.

In some examples, the first weld schedule corresponds to one or more of a root pass welding operation, a hot pass welding operation, a joint fill welding operation, or a cap pass welding operation.

In some examples, one or more of the root pass welding operation, the hot pass welding operation, the joint fill welding operation, or the cap pass welding operation comprises one or more sub settings. In examples, the one or more sub settings comprises one or more of a dig setting, a droop setting, an arc control setting, or a hot start setting. In examples, the one or more sub settings for one or more of the root pass welding operation, the hot pass welding operation, the joint fill welding operation, or the cap pass welding operation is the same. In examples, the one or more sub settings for one or more of the root pass welding operation, the hot pass welding operation, the joint fill welding operation, or the cap pass welding operation is the different. In examples, the arc control sub setting further comprises a droop setting and a dig setting.

In some examples, the control circuitry receives one or more third inputs to control one or more operational settings of the welding power supply comprising one or more of a weld flat horizontal weld, a vertical weld, or an overhead weld; generates one or more third signals corresponding to the one or more operational settings in response to the one or more third inputs from the user interface; and transmits the one or more third signals to the welding power supply to control the welding power supply to implement the operational settings.

In some examples, the control circuitry receives one or more fourth inputs to control one or more welding parameters of the welding power supply comprising one or more of a weld flat horizontal weld, a vertical weld, or an overhead weld; generates one or more fourth signals corresponding to the one or more welding parameters in response to the one or more fourth inputs from the user interface; and transmits the one or more fourth signals to the welding power supply to control the welding power supply to implement the welding parameters.

In some examples, the one or more welding parameters includes one or more of a voltage, a current, a power value, a material type, a number of welds to perform, or a time of welding.

In some examples, the control circuitry receives a confirmation signal that the one or more first signals were received at the welding power supply and that the first weld schedule has been implemented in response to the one or more first inputs; and adjusts an indicia corresponding to the first weld schedule on the user interface to reflect the change at the welding power supply.

In some examples, the one or more indicia reflects information displayed on a welding user interface of the welding power supply. In some examples, wherein the one or more indicia comprises an icon, text, a graphic, or an animation, corresponding to the one or more welding parameters of the welding power system.

In some examples, the one or more weld schedules comprises values associated with one or more welding parameters including one or more of a voltage, a current, a power value, a material type, a number of welds to perform, or a time of welding.

In some examples, the remote device is a portable handheld wireless device.

In some examples, the remote user interface or the welding user interface comprises one or more of a button, a membrane panel switch, or a graphical user interface to provide input to control the welding power system.

In some examples, the control circuitry comprises a network interface to connect to a remote computing system via one or more of LAN, WAN, Bluetooth, Wi-Fi, or cellular networks. In some examples, the one or more signals between the remote device and the welding power supply are encoded with information to uniquely identify the respective device or system.

In some examples, the one or more signals between the remote system and the welding power supply are transmitted with one or more transmission characteristics to uniquely identify the respective system. In some examples, the control circuitry is configured to activate a supervisory mode to limit the remote device control of the one or more weld schedules to a predetermined number of weld schedules.

In some examples, the remote device operates in a display only mode, such that the user interface is prevented from controlling the welding power system. In some examples, the welding power system operates in a display only mode, such that the user interface is prevented from controlling the remote device.

In some disclosed examples, a method for monitoring or controlling a welding power supply to control and deliver power to one or more welding tools or accessories via a remote device comprises; receiving, at a user interface, one or more first inputs to implement a first weld schedule of one or more weld schedules; generating, at a control circuitry, one or more first signals corresponding to the first weld schedule in response to the one or more first inputs from the user interface; transmitting, via the transceiver, the one or more first signals to the welding power supply to control the welding power supply to implement the first weld schedule; receiving, via the user interface, one or more second inputs to implement a second weld schedule of the one or more weld schedules; generating, at the control circuitry, one or more second signals corresponding to the second weld schedule in response to the one or more second inputs from the user interface; and transmitting, via the transceiver, the one or more second signals to the weld power supply to control the welding power supply to implement the second weld schedule.

In some examples, the first weld schedule corresponds to one or more of a root pass welding operation, a hot pass welding operation, a joint fill welding operation, or a cap pass welding operation.

In some examples, the method includes receiving, at the control circuitry, a confirmation signal that the one or more first signals were received at the welding power supply and that the first weld schedule has been implemented in response to the one or more first inputs; and adjusting, via the control circuitry, an indicia corresponding to the first weld schedule on the user interface to reflect the change at the welding power supply, wherein the one or more indicia comprises an icon, text, a graphic, or an animation, corresponding to the one or more welding parameters of the welding power system.

Several examples are provided with respect to welding power supplies and various accessories. However, the concepts and principles disclosed herein are equally applicable to various power and control systems, including but not limited to engine-driven power systems driving one or more of a generator, an air compressor, and/or a hybrid welding power supply.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld, which may include a weld schedule, operational settings, or others. A welding program may further include other software, algorithms, processes, or other logic to control one or more welding-type devices to perform a weld.

Figure 3A:
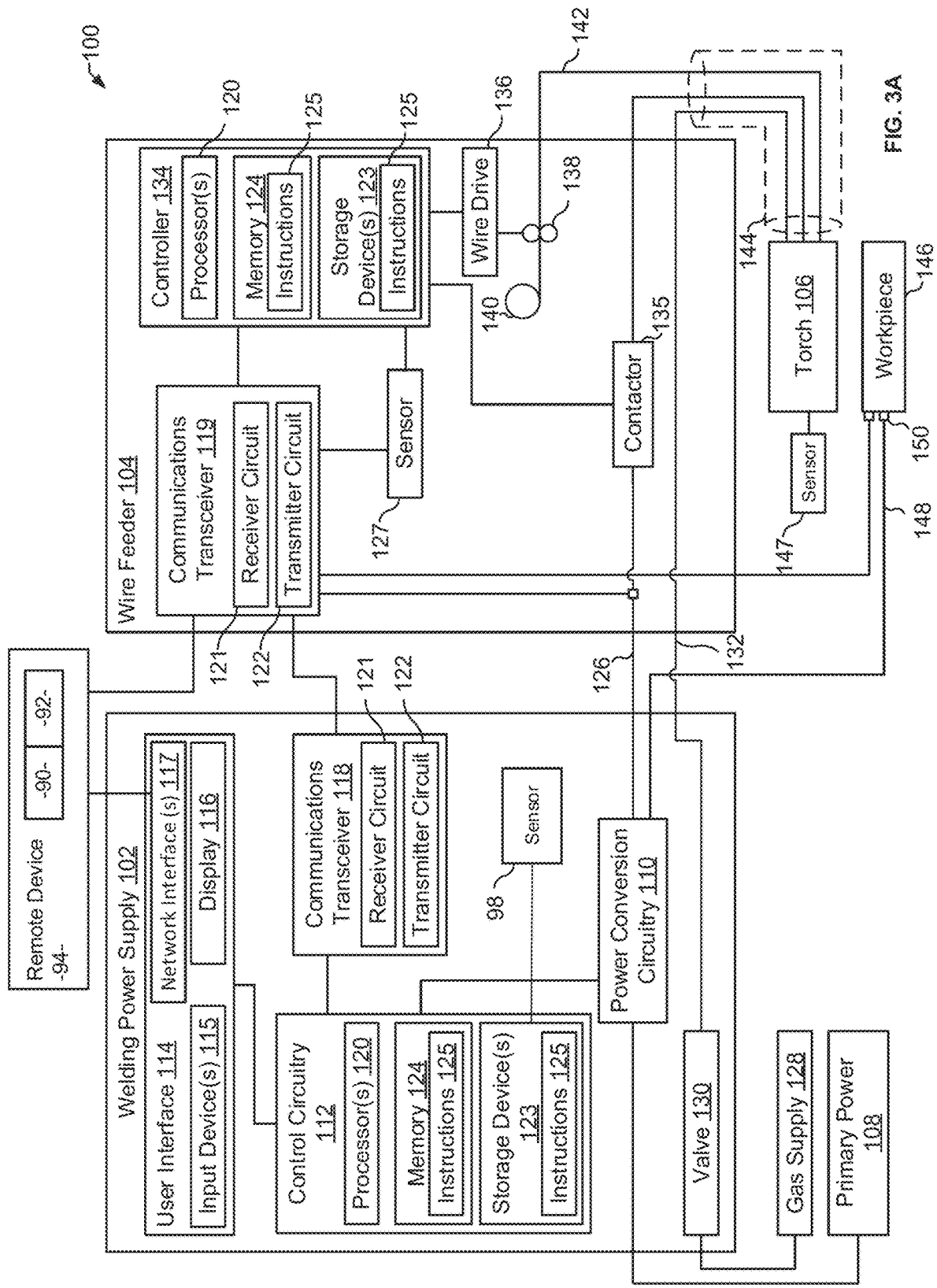
FIG. 3A is a schematic diagram of an example welding system, in accordance with aspects of this disclosure.
Figure 3B:
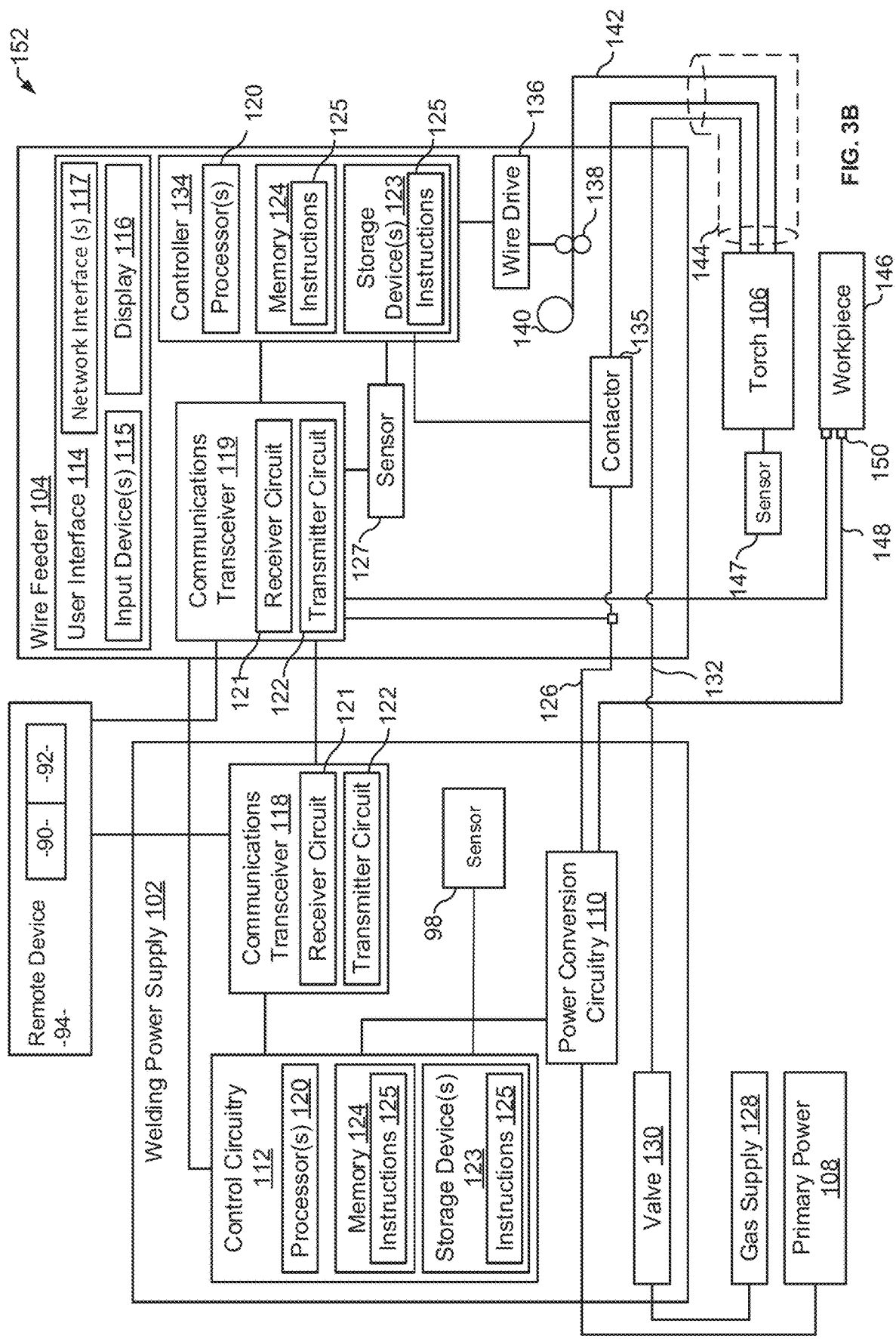
FIG. 3B is a schematic diagram of another example welding system, in accordance with aspects of this disclosure.
Figure 3C:
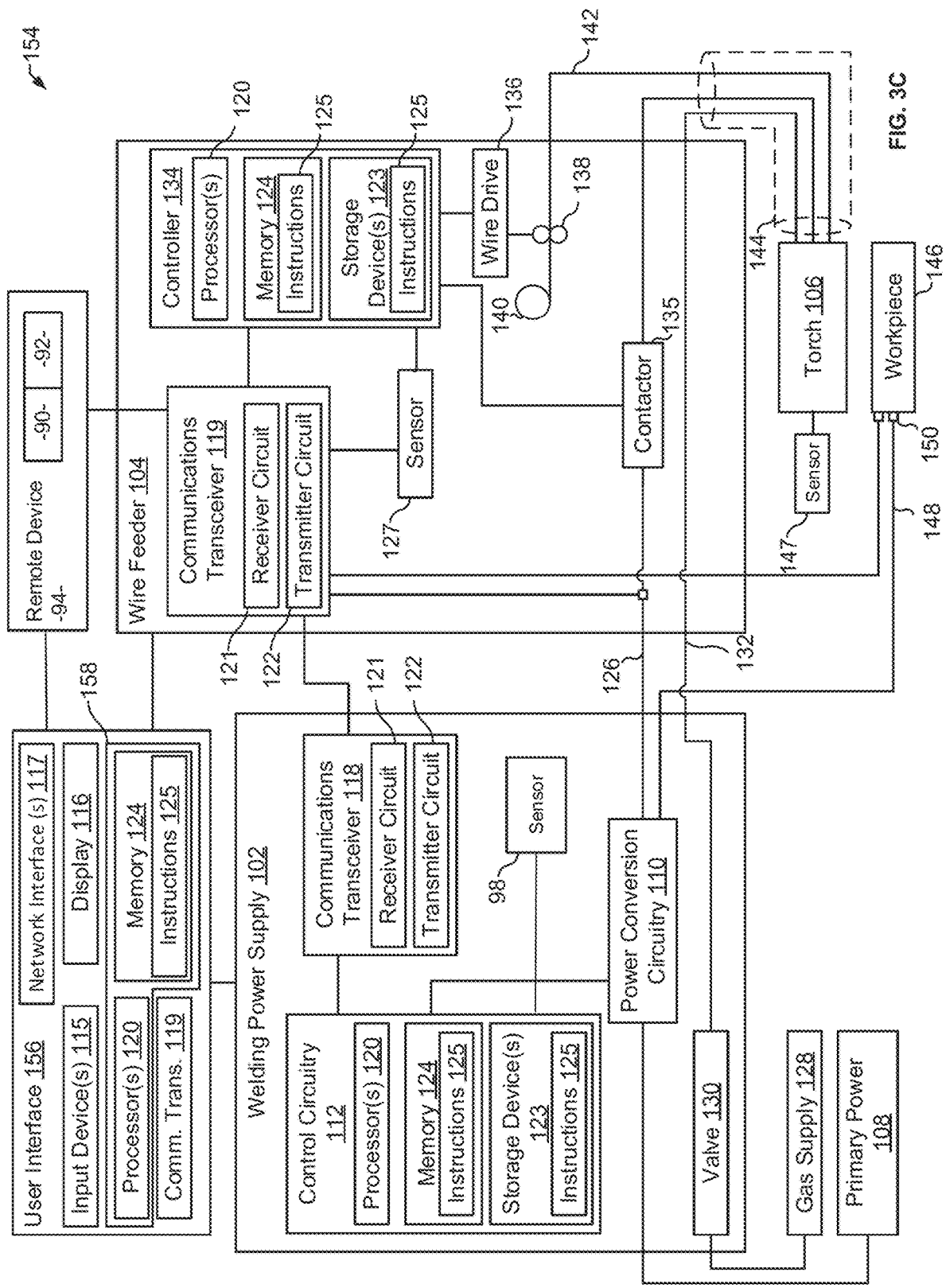
FIG. 3C is a schematic diagram of another example welding system, in accordance with aspects of this disclosure.

FIG. 1A illustrates a detail view of an example remote device 94. As shown, the remote device 94 provides one or more remote user interfaces, such as a battery indicator 42, a remote display 44, and one or more input devices 46-56 (e.g., a button, knob, switch, and/or a touchscreen). For example, the input devices 46-56 can allow a user to toggle through a selection via buttons 46. A selection can be made to control an associated engine via input 52, welding process via input device 56, a weld sequence program via input device 54, power via input device 48, and/or call a menu via input device 50. Thus, the remote device 94 is operable to receive inputs from the input devices 46-56 associated with one or more commands, transmit signals comprising data corresponding to the inputs (e.g., via a remote transceiver 92 of a remote control circuitry 90, as shown in FIGS. 3A-3C), and have an indicia on the remote display 44 change to reflect the command, as disclosed herein.

Figure 1B:
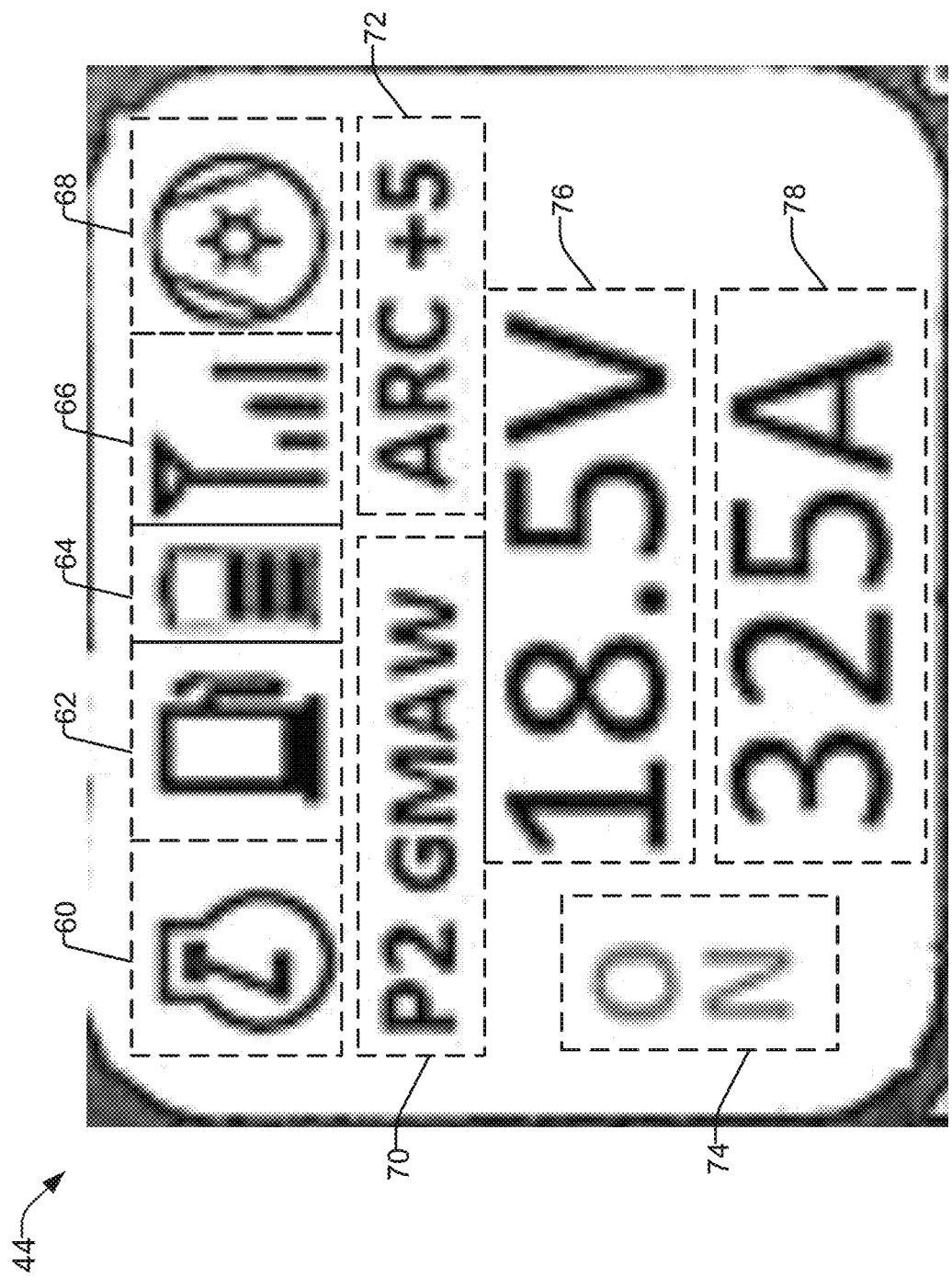
FIG. 1B is an illustration of an example display of a remote device, in accordance with aspects of this disclosure.

FIG. 1B illustrates a detail view of the remote display 44. As shown, the remote display 44 includes multiple regions, each to display one or more indicia corresponding to one or more operating parameters. In some examples, each region displays a single indicia, which may change color, flash, appear, disappear, or provide some other visual cue to provide information to the operator. In some examples, which indicia and/or which type of indicia is dynamic, such that the operator may select a particular indicia to be displayed in a predetermined region, and/or one or more events can trigger a transition from one indicia to another within a given region (e.g., when a battery is out of energy, a battery icon can be replaced with a lightning bolt indicating the battery is being charged).

In the example of FIG. 1B, the regions can include one or more of an icon, text, a graphic, or an animation. As shown, region 60 provides an engine icon (e.g., to represent whether an associated engine power driven system is on), region 62 provides a fuel gauge icon (e.g., for the associated engine), region 64 provides a battery level icon (e.g., for an associated energy storage device, such as in a hybrid power generation system), region 66 provides a wireless signal icon (e.g., for an associated communications network), region 68 illustrates an air compressor icon (e.g., to represent whether an associated air compressor is on), region 70 provides text indicative of a weld schedule, region 72 provides text indicative of an arc length setting, region 74 provides text indicative of a power on/off status, region 76 provides an output voltage icon, and region 78 provides an output current icon.

As disclosed herein, each region and/or indicia can provide information associated with one or more welding parameters. Each indicia can be changed in response to a change to one or more of the welding parameters (and adjusted value) and/or a status change (a change in wireless signal strength). Additional or alternative indicia can correspond to engine run time, wire feed speed, weld sequence, material type, or material thickness, for instance. In some examples, the display 44 can include a visual display (e.g., a graphical user interface, and/or a touchscreen), as well as one or more input devices (e.g., a button, knob, switch, and/or a touchscreen).

As shown in FIGS. 1A and 1B, the weld schedule is currently assigned to P2 GMAW (shown in region 70). In some examples, an operator may seek to change from an existing weld schedule to a new weld schedule. For instance, during a give welding operation, the part may require different weld schedules to ensure a proper weld. This may include a change in joint, a change in orientation, a change in material, etc.

Figure 1C:
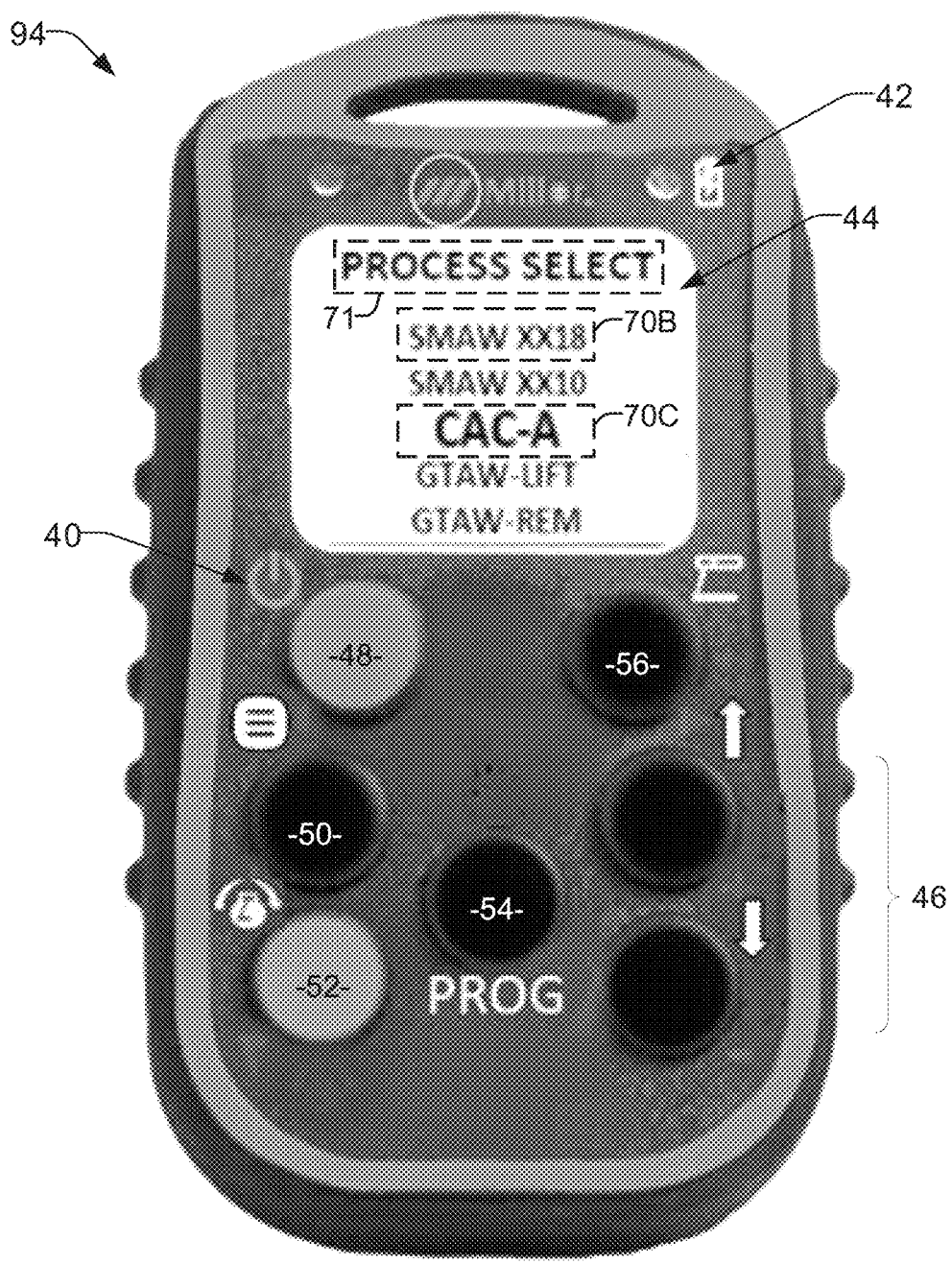
FIG. 1C is an illustration of an example remote device providing a listing of weld schedules, in accordance with aspects of this disclosure.

In some examples, remote weld schedule control can be implemented via the remote device 94 by employing input device 56. FIG. 1C is an illustration of an example remote device providing a listing of weld schedules. As shown, input device 56 can be a button, which an operator may press to view a process select icon in region 71. The input device 56 can be pressed and released (or some other suitable action, such as scrolling with input devices 46) until a given weld process (e.g., is highlighted, as shown in region 70A, at the introductory screen. The list of weld schedules can be cycled through by use of the up or down arrows of input devices 56 to display available weld schedules process (e.g., corresponding to a connected and/or controlled welding system).

Thus, an operator may scroll to region 70B to implement a SMAW XX18 weld schedule. To select the desired weld schedule, one or more input buttons may be pressed (e.g., input device 56). In some examples, during program selection, new adjustments to the one or more welding parameters and/or the weld schedule are automatically saved to the current selected program. Thus, a highlighted weld schedule will automatically apply if no action is taken, and the settings will be saved and transmitted to the associated welding system.

Once selected, the control circuitry 90 generates one or more signals corresponding to the selected weld schedule. The signals may contain data and/or be transmitted with characteristics to uniquely identify the selected weld schedule. Thus, the signals are transmitted via the transceiver to the welding power supply to control the welding power supply to implement the selected weld schedule (e.g., XX 18).

The remote device 94 displays information associated with the selected weld schedule in display 44, including welding parameters associated (such as voltage, current, arch length, etc.) with the weld schedule and/or other operating parameters, as well as stores information regarding previous inputs.

Figure 1D:
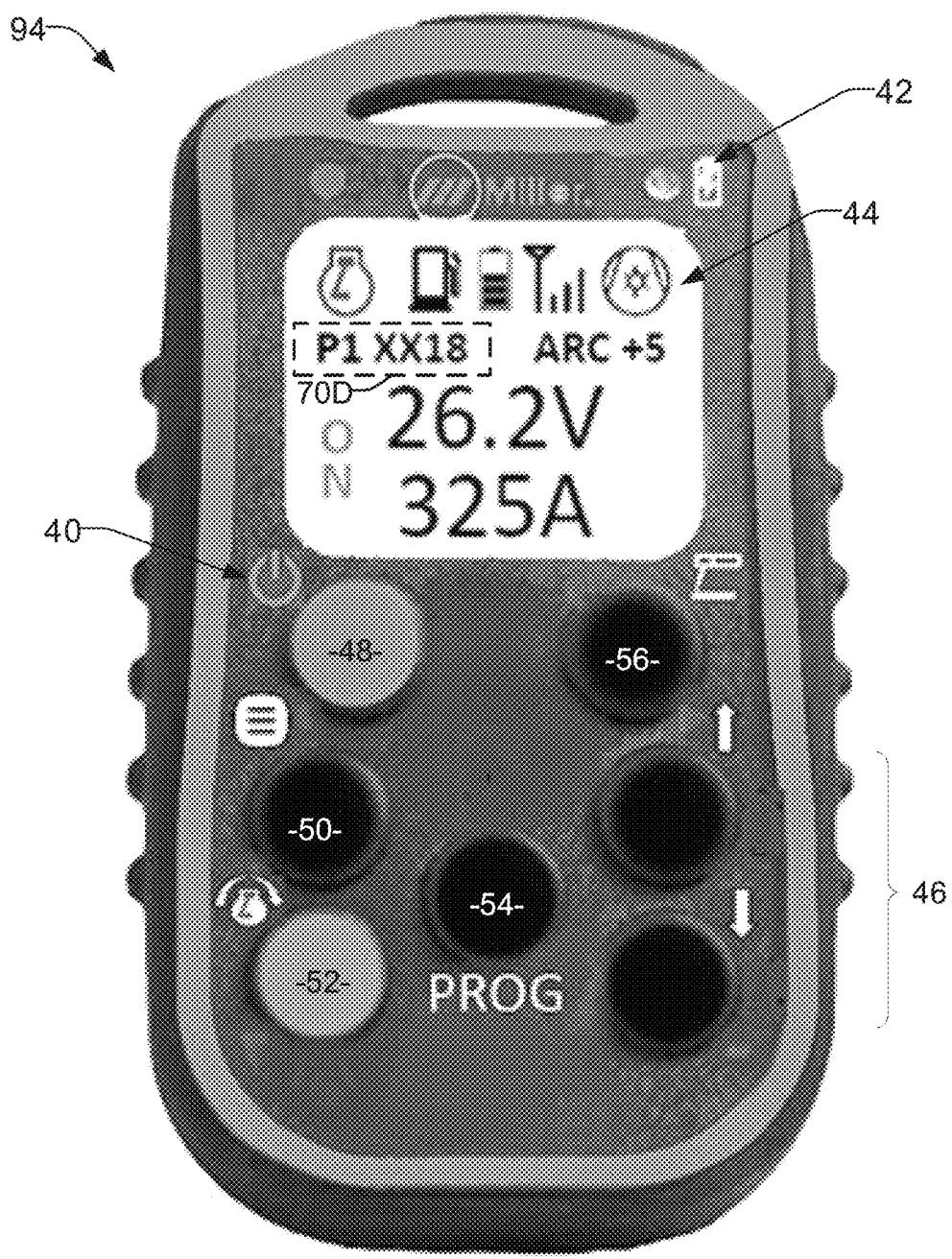
FIG. 1D is an illustration of an example remote device providing an updated weld schedule, in accordance with aspects of this disclosure.

FIG. 1D is an illustration of an example remote device providing an updated weld schedule. As shown, the weld schedule "P1 XX18" is displayed in region 70D. Welding parameters associated with the selected weld schedule will similarly update (e.g., voltage, current, etc.), either according to the selected weld schedule and/or an operator selected value. Thus, the remote device 94 has updated from a weld schedule of "P2 GMAW" shown in FIGS. 1A and 1B to the weld schedule "P1 XX18" shown in FIG. 1D. Also shown, the voltage and current have updated to reflect the selected weld schedule.

FIG. 2A provides an example listing of weld schedules and sub-schedules, in accordance with aspects of this disclosure. In some examples, the weld schedules can include TIG, SMAW, GMAW, and/or other various weld schedules known or customized by the operator for a particular welding operation. Sub schedules may also be included, such as a pulsed output, auto-stop, auto-crater, dig, arc control, hot start, and/or other suitable sub schedules that may be known or customized. Additional sub schedules and/or additional settings may be provided (not shown). In some examples, the sub schedules for one or more weld schedules are the same, whereas in other examples one or more sub schedules are different for different weld schedules. Further, an operator may employ the remote device 94 to create a new weld schedule, sub schedule, operational settings, sub settings, etc.

FIG. 2B provides an example listing of operational settings and sub-settings, in accordance with aspects of this disclosure. In some examples, the operational settings include one or more of a root pass welding operation, a hot pass welding operation, a joint fill welding operation, or a cap pass welding operation. In some examples, the sub settings includes one or more of a dig setting, a droop setting, an arc control setting, or a hot start setting.

The operational settings and/or the sub settings can correspond to one or more weld schedules, and can be individually customized in some examples. For instance, an operator may provide inputs via the one or more input devices 46-54 to adjust a value associated with one or more of the operational settings and/or sub settings. In some examples, the one or more sub settings for one or more of the root pass welding operation, the hot pass welding operation, the joint fill welding operation, or the cap pass welding operation is the same.

In some examples, the one or more sub settings for one or more of the root pass welding operation, the hot pass welding operation, the joint fill welding operation, or the cap pass welding operation is the different.

As shown in FIG. 2B, the arc control sub setting can further include additional settings, such as a droop setting and a dig setting, which may also be customized according to operator preferences and/or a particular welding operation.

As disclosed herein, an operator may access the listings, scroll through, and select a weld schedule and/or an operational setting to control the welding power supply to deliver power to a welding tool.

FIG. 3A is a block diagram of an example welding system 100, which includes welding-type power supply 102 containing power conversion circuitry 110 and control circuitry 112. As shown in FIG. 3A, the example welding system 100 also includes a wire feeder 104, and a welding torch 106. The remote device 94, a remote control circuitry 90 and a remote transceiver 92 are communicably coupled to the welding system 100, as well as the other components (e.g., a power generation system). The welding system 100 powers, controls, and supplies consumables to a welding application.

By use of the remote device 94, an operator can transmit commands to as well as receive information and alerts from the control circuitry 112 via one or more of a central communications transceiver and/or interface 92. Additionally, the remote device 94 may provide the status of the welding system 100 and the connected components (e.g., on the display and/or via audible and/or haptic feedback).

In some examples, the remote control circuitry 90 initiates transfer of data between the remote system and the welding system 100 at periodic intervals, in response to an adjustment to the one or more weld schedules or welding parameters, in response to a user input, or a combination thereof. The remote control circuitry 90 of the remote device 94 further includes a network interface to connect to the remote transceiver 92, the welding power supply 102, the wire feeder 104, and/or a remote computing system via one or more of network types or communications protocols, including by not limited to LAN, WAN, Bluetooth, Wi-Fi, or cellular networks.

In some examples, the remote device 94 is a portable handheld wireless device. In some examples, the remote device 94 is a smartphone, remote computer, tablet computer, dongle, accessory, or other device suitable to analyze, receive and/or transmit data wirelessly and/or via wired communications. In examples, the remote user interface or the welding user interface comprises one or more of a button, a membrane panel switch, or a graphical user interface to provide input to control the welding system.

In some examples, signals communicated between the remote system 94 and the welding system 102 are encoded with information to uniquely identify the respective system. In some examples, the signals are transmitted with one or more transmission characteristics to uniquely identify the respective system.

In some examples, the listed weld schedules correspond to a root pass welding operation, a hot pass welding operation, a joint fill welding operation, or a cap pass welding operation. In examples, the remote device 94 may control one or more of operational settings and/or welding parameters of the welding power supply 102. For instance, the control circuitry 90 may receive one or more inputs to control one or more operational settings of the welding power supply 102, which may include one or more of a weld flat horizontal weld, a vertical weld, or an overhead weld. The control circuitry 90 may then generate signals corresponding to the operational settings in response to the inputs from the user interface and transmit the signals to the welding power supply 102 to control the welding power supply 102 to implement the operational settings.

Similarly, the control circuitry 90 can receive additional inputs to control one or more welding parameters of the welding power supply 102, which can include at least a weld flat horizontal weld, a vertical weld, or an overhead weld. One or more signals corresponding to the welding parameters are generated in response to the inputs, and transmitted to the welding power supply 102 to control the welding power supply 102 to implement the welding parameters. For example, the welding parameters can include a voltage, a current, a power value, a material type, a number of welds to perform, or a time of welding.

Having been implemented, the welding power supply 102 is configured to provide confirmation to the remote device 94 that the command has been executed, such as via communication transceiver 118 and/or network interface 117. For instance, the control circuitry 90 is to receive a confirmation signal via transceiver 92 that the first, second, third or fourth signals were received at the welding power supply 102 and that the selected weld schedule, operating and/or welding parameters have been implemented in response. Having received that confirmation, the control circuit 90 adjusts an indicia corresponding to the implemented weld schedule, operational settings and/or welding parameters on the user interface display 44 to reflect the change at the welding power supply 102 (e.g., at user interface 114). In circumstances when confirmation is not received, the control circuitry 90 can be programmed to display the last confirmed weld schedule, operational settings, and/or welding parameters, and/or update the display 44 to the selected weld schedule, operating and/or welding parameters, based on the particular welding operation and/or operator preferences.

In some examples, the remote device 90 is a portable handheld wireless device. In some examples, the remote user interface or the welding user interface comprises one or more of a button, a membrane panel switch, or a graphical user interface to provide input to control the welding power system. In some examples, the control circuitry 90 includes one or more network interfaces or transceivers 90 to connect to a remote computing system via one or more of LAN, WAN, Bluetooth, Wi-Fi, or cellular networks. In some examples, the various signals between the remote device 90 and the welding power supply 102 and/or another remote computing system are encoded with information to uniquely identify the respective device or system. In some examples, the various signals between the remote system 90 and the welding power supply 102 are transmitted with one or more transmission characteristics to uniquely identify the respective system.

In some examples, the power supply 102 receives power from an engine driven power source (e.g., via a generator), mains power, a generator, an energy storage device, or other suitable power source, and directly supplies input power to the welding torch 106 via power conversion circuitry 112. The welding torch 106 may be a torch configured for shielded metal arc welding (SMAW, or stick welding), gas tungsten arc welding (GTAW, or tungsten inert gas (TIG)) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 3A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding The power supply 102 receives primary power 108 (e.g., from an engine driven power source via generator, mains power, a generator, an energy storage device), conditions the primary power, and provides an output power to one or more welding devices in accordance with demands of the system 100. The power supply 102 includes the power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The control circuitry 112 controls the operation of the power supply 102 and may control the operation of a power delivery system that provides the primary power 108 in some examples. The power supply 102 also includes one or more interfaces, such as a user interface 114 and network interface 117. The control circuitry 112 receives input from the user interface 114, through which a user may control one or more components (including the power source and/or one or more accessories), and or choose a process and/or input desired parameters for a welding output (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, remote device 94, etc. Furthermore, the control circuitry 112 controls operating parameters based on input by the user as well as based on other operating parameters. Specifically, the user interface 114 may include a display 116 for presenting, showing, or indicating, information to an operator. In some examples, the control circuitry 112 receives an input provided via remote device 94 via network interface 117. In this manner, the control circuitry 112 can provide data regarding operation of the system 100 (including alerts associated with operation of the power supply 100) and/or receive commands from the remote device 94 (e.g., a change in weld schedule).

The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 3A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the remote control circuitry 90 stores one or more lists associated with values associated with one or more weld schedules or welding parameters associated with the welding system 100, such as in memory 124. The remote control circuitry 90 can access the one or more lists in response to an input (e.g., from an operator input). An input with data corresponding to the one or more weld schedules can be provided via the one or more user input devices 46-54 of remote device 94 via transceiver 92. In some examples, the remote control circuitry 90 is configured to store the data in a memory storage device (e.g., at the remote control circuitry 90 and/or memory 124).

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 3A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor 135 (e.g., high amperage relay) is employed and controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 104 to monitor one or more welding parameters (e.g., power, voltage, current, wire feed speed, etc.) to inform the controller 134 during the welding process. In some examples, one or more sensors are included in the welding power supply 102.

In some examples, the remote device 94 includes remote control circuitry 90 operable to transmit information to and receive information from an auxiliary device, such as wire feeder 104. The wire feeder 102 responds with control and/or diagnostic information, and the remote device 94 can store (in memory of remote control circuitry 90) and/or display the diagnostic information on the remote user interface 44.

In some examples, the remote device 94 serves as link between the auxiliary devices and the welding power supply 102. Thus, the remote device 94 can receive commands or data from the welding power supply 102 (or the auxiliary device), and transmit the commands or data from the welding power supply 102 (or the auxiliary device) to the auxiliary device (or the welding power supply 102).

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process. Although illustrated with the torch 106 (e.g., a welding tool, as described herein) connecting through wire feeder 104, in some examples the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

FIG. 3B is a schematic diagram of another example welding system 152 in which the wire feeder 104 includes the user interface 114 in addition or as an alternative to the user interface on the welding power supply 102. In the example of FIG. 3B, the control circuitry 134 of the wire feeder 104 implements the determinations of the welding program and welding parameters which are described with reference to the control circuitry 112 of FIG. 3A.

FIG. 3C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 3A-3C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of the engine driven power system 80, the power supply 102, and wire feeder 104, in some examples.

Figure 4:
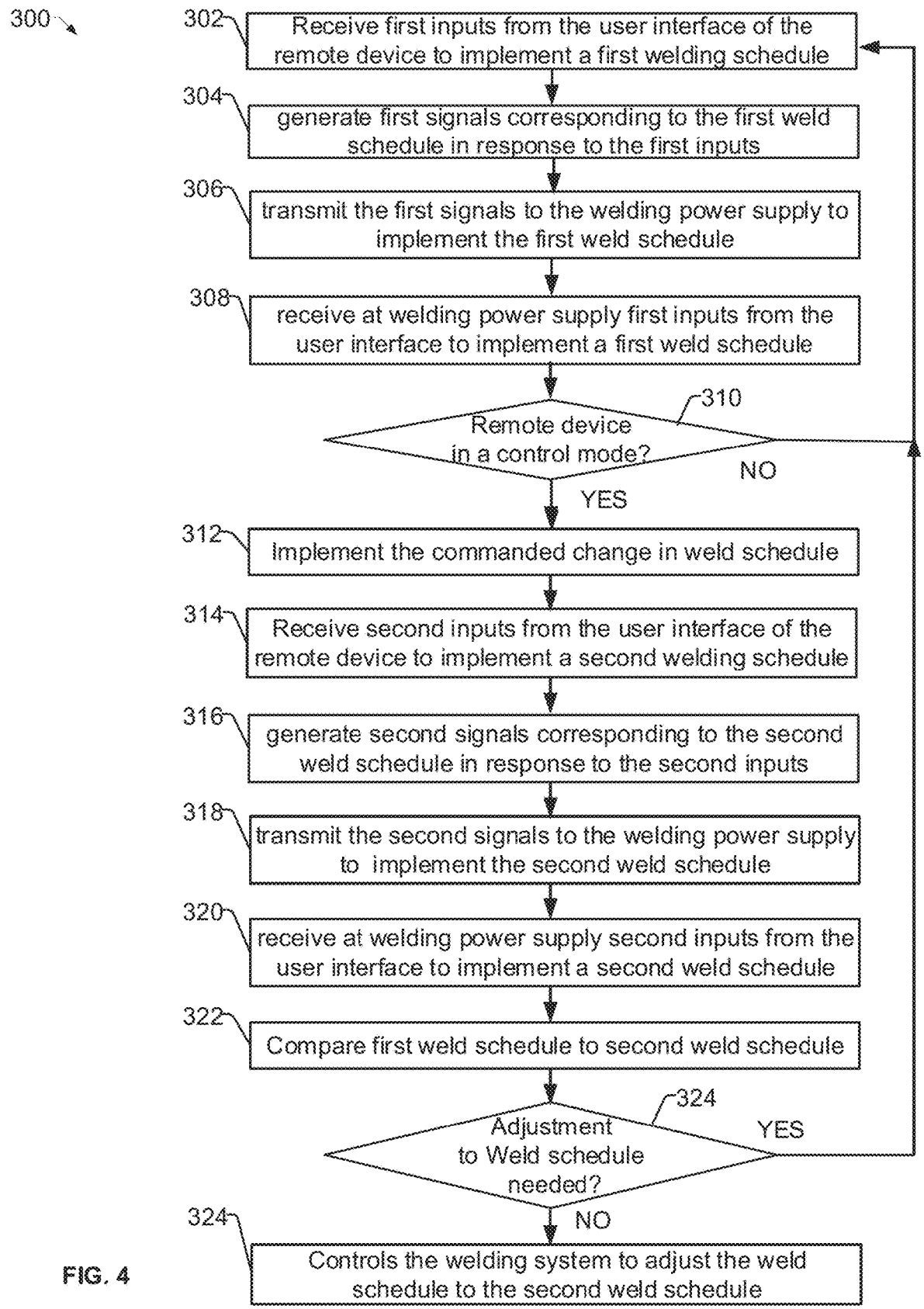
FIG. 4 is a flowchart representative of an example method of remotely controlling a weld schedule, in accordance with aspects of this disclosure.

FIG. 4 provides a flowchart representative of example machine readable instructions 300 which may be executed by the example system 80 of FIG. 1A. The example instructions 300 may be stored in the storage device(s) 123 and/or the memory 124 and executed by the processor(s) 120 of the control circuitry 112. The example instructions 300 are described below with reference to the systems of FIGS. 1A through 3C.

In block 302, one or more first inputs are received from the user interface (e.g., an input device 46-54) of the remote device 92 to implement a first weld schedule of the one or more weld schedules (e.g., provided in FIG. 2A).

In block 304, the remote control circuitry 90 generates one or more first signals corresponding to the first weld schedule in response to the one or more first inputs from the user interface. In block 306, the remote control circuitry 90 transmits via remote transceiver 92 the one or more first signals to the welding power supply 102 to control the welding power supply to implement the first weld schedule.

In block 308, the welding power supply 102 receives (via a network interface 117 or transceiver) one or more first inputs from the user interface to implement a first weld schedule of the one or more weld schedules. In block 310, the welding power supply 102 (via control circuitry 112) determines if the remote device 92 is in a shared or dedicated control mode. If the remote device 90 is not in a control mode, the method returns to block 302. If the remote device 90 is in a control mode and making an authorized command, in block 312, the welding power supply 102 (via control circuitry 112) implements the commanded change in weld schedule.

In block 314, a second input is received for at the user interface to implement a second weld schedule of the one or more weld schedules.

In block 316, the remote control circuitry 90 generates one or more first signals corresponding to the first weld schedule in response to the one or more first inputs from the user interface. In block 318, the remote control circuitry 90 transmits via remote transceiver 92 the one or more second signals to the welding power supply 102 to control the welding power supply to implement the second weld schedule.

In block 320, the welding power supply 102 receives (via a network interface 117 or transceiver) one or more second inputs from the user interface to implement a second weld schedule of the one or more weld schedules.

In block 322, the central control circuitry compares the first weld schedule (existing weld schedule) against the second weld schedule and determines if an adjustment is needed in block 324. If no adjustment is needed, the method returns to block 302. If an adjustment is required to the weld schedule, the method advances to block 326 to adjust the weld schedule from the first to the second weld schedule.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of one or more welding parameters for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to various types of welders, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A remote device for monitoring or controlling a welding power supply to control and deliver power to one or more welding tools or accessories comprises:
 a user interface to receive one or more inputs;
 a control circuitry comprising a transceiver configured to transmit one or more signals to or receive one or more signals from the welding power supply, the one or more signals including data corresponding to one or more weld schedules, the control circuitry configured to:
  receive one or more first inputs from the user interface to implement a first weld schedule of the one or more weld schedules, wherein the first weld schedule corresponds to one or more of a root pass welding operation, a hot pass welding operation, a joint fill welding operation, or a cap pass welding operation;
  generate one or more first signals corresponding to the first weld schedule in response to the one or more first inputs from the user interface;
  transmit the one or more first signals to the welding power supply to control the welding power supply to implement the first weld schedule;
  receive one or more second inputs from the user interface to implement a second weld schedule of the one or more weld schedules;
  generate one or more second signals corresponding to the second weld schedule in response to the one or more second inputs from the user interface; and transmit the one or more second signals to the weld power supply to control the welding power supply to implement the second weld schedule.

2. The remote device as defined in claim 1, wherein one or more of the root pass welding operation, the hot pass welding operation, the joint fill welding operation, or the cap pass welding operation comprises one or more sub settings.

3. The remote device as defined in claim 2, wherein the one or more sub settings comprises one or more of a dig setting, a droop setting, an arc control setting, or a hot start setting.

4. The remote device as defined in claim 3, wherein the one or more sub settings selected for use on one or more of the root pass welding operation, the hot pass welding operation, the joint fill welding operation, or the cap pass welding operation is the same.

5. The remote device as defined in claim 3, wherein the one or more sub settings selected for use on one or more of the root pass welding operation, the hot pass welding operation, the joint fill welding operation, or the cap pass welding operation is the different.

6. The remote device as defined in claim 3, wherein the arc control sub setting further comprises a droop setting and a dig setting.

7. The remote device as defined in claim 1, wherein the control circuitry is further configured to:
receive one or more third inputs to control one or more operational settings of the welding power supply comprising one or more of a weld flat horizontal weld, a vertical weld, or an overhead weld;
generate one or more third signals corresponding to the one or more operational settings in response to the one or more third inputs from the user interface; and
transmit the one or more third signals to the welding power supply to control the welding power supply to implement the operational settings.

8. The remote device as defined in claim 1, wherein the control circuitry is further configured to:
receive one or more fourth inputs to control one or more welding parameters of the welding power supply comprising one or more of a weld flat horizontal weld, a vertical weld, or an overhead weld;
generate one or more fourth signals corresponding to the one or more welding parameters in response to the one or more fourth inputs from the user interface; and
transmit the one or more fourth signals to the welding power supply to control the welding power supply to implement the one or more welding parameters, wherein the one or more welding parameters includes one or more of a voltage, a current, a power value, a material type, a number of welds to perform, or a time of welding.

9. The remote device as defined in claim 1, wherein the one or more weld schedules comprises values associated with one or more welding parameters including one or more of a voltage, a current, a power value, a material type, a number of welds to perform, or a time of welding.

10. The remote device as defined in claim 1, wherein the remote device is a portable handheld wireless device.

11. The remote device as defined in claim 1, wherein the control circuitry further comprises a network interface to connect to a remote computing system via one or more of LAN, WAN, Bluetooth, Wi-Fi, or cellular networks.

12. The remote device as defined in claim 1, wherein the one or more signals between the remote device and the welding power supply are encoded with information to uniquely identify the respective device or system.

13. The remote device as defined in claim 1, wherein the one or more signals between the remote system and the welding power supply are transmitted with one or more transmission characteristics to uniquely identify the respective system.

14. The remote device as defined in claim 1, wherein the control circuitry is further configured to activate a supervisory mode to limit the remote device control of the one or more weld schedules to a predetermined number of weld schedules.

15. The remote device as defined in claim 1, wherein the remote device operates in a display only mode, such that the user interface is prevented from controlling the welding power system.

16. The remote device as defined in claim 1, wherein the welding power system operates in a display only mode, such that the user interface is prevented from controlling the remote device.

17. A remote device for monitoring or controlling a welding power supply to control and deliver power to one or more welding tools or accessories comprises:
a user interface to receive one or more inputs;
a control circuitry comprising a transceiver configured to transmit one or more signals to or receive one or more signals from the welding power supply, the one or more signals including data corresponding to one or more weld schedules, the control circuitry configured to:
receive one or more first inputs from the user interface to implement a first weld schedule of the one or more weld schedules;
generate one or more first signals corresponding to the first weld schedule in response to the one or more first inputs from the user interface;
transmit the one or more first signals to the welding power supply to control the welding power supply to implement the first weld schedule;
receive one or more second inputs from the user interface to implement a second weld schedule of the one or more weld schedules;
generate one or more second signals corresponding to the second weld schedule in response to the one or more second inputs from the user interface; and
transmit the one or more second signals to the weld power supply to control the welding power supply to implement the second weld schedule;
receive a third input to control one or more operational settings of the welding power supply comprising one or more of a weld flat horizontal weld, a vertical weld, or an overhead weld;
generate one or more third signals corresponding to the one or more operational settings in response to the one or more third inputs from the user interface; and
transmit the one or more third signals to the welding power supply to control the welding power supply to implement the operational settings.

18. The remote device as defined in claim 17, wherein the control circuitry is further configured to:
receive a confirmation signal that the one or more first signals were received at the welding power supply and that the first weld schedule has been implemented in response to the one or more first inputs; and
adjust an indicia corresponding to the first weld schedule on the user interface to reflect the change at the welding power supply.

19. The remote device as defined in claim 18, wherein the one or more indicia comprises an icon, text, a graphic, or an animation, corresponding to the one or more welding parameters of the welding power system.

* * * * *